United States Patent
Ho et al.

(10) Patent No.: US 8,464,956 B2
(45) Date of Patent: Jun. 18, 2013

(54) SYSTEM AND METHOD FOR SECURITY TAG DEPLOYMENT USING REVERSIBLE ADHESIVES

(75) Inventors: Wing Kei Ho, Boynton Beach, FL (US); Hubert A. Patterson, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 114 days.

(21) Appl. No.: 13/039,864

(22) Filed: Mar. 3, 2011

(65) Prior Publication Data

US 2011/0215157 A1 Sep. 8, 2011

Related U.S. Application Data

(60) Provisional application No. 61/339,778, filed on Mar. 8, 2010.

(51) Int. Cl.
*G06K 19/06* (2006.01)

(52) U.S. Cl.
USPC .......................................... 235/492; 235/488

(58) Field of Classification Search
USPC ................. 235/492, 486, 487, 488, 385, 383, 235/380, 375
See application file for complete search history.

(56) References Cited

U.S. PATENT DOCUMENTS

| 6,509,555 | B1 | 1/2003 | Riess |
| 6,855,760 | B1 | 2/2005 | Kirsten |
| 6,942,156 | B2 * | 9/2005 | Ohta et al. ................ 235/492 |
| 2007/0251648 | A1 * | 11/2007 | Northen et al. ............. 156/598 |
| 2008/0272586 | A1 * | 11/2008 | Hick et al. ................... 283/81 |
| 2009/0280330 | A1 * | 11/2009 | Xie et al. .................. 428/413 |
| 2010/0001079 | A1 * | 1/2010 | Martin et al. ............. 235/492 |
| 2010/0019909 | A1 | 1/2010 | Norman |
| 2012/0176226 | A1 * | 7/2012 | Mackenzie et al. ........ 340/10.1 |

FOREIGN PATENT DOCUMENTS

WO WO 2010/135726 A2 11/2010

OTHER PUBLICATIONS

EPO International Search Report dated Sep. 15, 2011 for corresponding appln PCT/US11/000422.

* cited by examiner

*Primary Examiner* — Thien M Le
(74) *Attorney, Agent, or Firm* — Alan M. Weisberg; Christopher & Weisberg, P.A.

(57) ABSTRACT

A method and system for security tag attachment using a reversible adhesive in which a security tag has an outer surface and an inner volume. The tag includes at least one of an Electronic Article Surveillance (EAS) element and a Radio Frequency Identification (RFID) element disposed within the inner volume. The system also includes a reversible adhesive disposed on at least a portion of the outer surface.

20 Claims, 5 Drawing Sheets

SYSTEM AND METHOD FOR SECURITY TAG DEPLOYMENT USING REVERSIBLE ADHESIVES

CROSS-REFERENCE TO RELATED APPLICATION

This application is related to and claims priority to U.S. Provisional Patent Application No. 61/339,778, filed Mar. 8, 2010, entitled "System and Method for Security Tag Deployment Using Reversible Adhesives," the entire contents of which is hereby incorporated herein by reference.

STATEMENT REGARDING FEDERALLY SPONSORED RESEARCH OR DEVELOPMENT n/a

FIELD OF THE INVENTION

The present invention relates generally security system anti-theft tags, and more specifically to a method and system for security tag attachment using a reversible adhesive.

BACKGROUND OF THE INVENTION

Electronic article surveillance ("EAS") systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected can be tagged with security tags including an EAS marker that, when active, generates a response signal when passed through this interrogation zone. An antenna and receiver in the same or another "pedestal" detects this response signal and generates an alarm.

The security tag can also include an RFID element. The RFID element that is commonly incorporated in retail stores and is used in conjunction with an RFID reader. When the RFID element is within the interrogation zone of the RFID reader, the RFID element may be activated and provide information regarding the item associated with the RFID element (e.g., product description, serial number, location, etc.). In particular, the RFID element receives and responds to radio frequency ("RF") signals to provide information related to the item that is within range of the RFID reader.

However, in certain scenarios, attachment of these security tags may damage the item the tag is meant to protect. Most conventional hard tags require a hole to be punctured into the item to be protected. This may damage the item. In particular, the movement of the EAS/RFID security tag as a consumer touches at or puts on an item may further increase the size of the initial puncture hole caused by the clamp, thereby damaging the item. While placement of the hard tag on a specific part of the item may help conceal this damage, the item has nevertheless been damaged and may cause a consumer to think twice about purchasing the item. As such, conventional hard tag mechanisms employed to protect an item may in turn end up damaging the item and causing the consumer not to purchase the item.

Non-hard tag solutions may help prevent possible damage from hard tags and may be relatively low in cost, but lack the level of security of the hard tag attachment mechanism. One commonly used non-hard tag solution uses swing tickets including EAS/RFID labels. For example, a swing ticket made from cardstock may include EAS/RFID mechanisms in which the swing ticket is typically attached to an item such as clothing and other goods using thin plastic tagging pins. The plastic tagging pins are attached using a tagging gun that pierces the item to insert the pin and the swing ticket. However, the swing ticket may be easily removed without the use of tools since the ticket can be either torn away from the pin or the pin manipulated to allow the extraction of the ticket. Even if the swing ticket itself is strengthened, e.g., by using hard plastic, it is still defeatable, thereby, leaving the item unprotected from possible theft.

Therefore, what is needed is a system and method for a security tag application system with an attachment mechanism which is lower in cost than current hard tag attachment systems, but has a higher level of security than provided by swing tickets. Moreover, there is a need for a security tag with an attachment mechanism that does not damage the item the tag was meant to protect.

SUMMARY OF THE INVENTION

The present invention provides a method and system for a security tag such as a security tag using reversible adhesives to removably affix the tag to an article.

One aspect of the invention provides a system in which a security tag has an outer surface and an inner volume. The tag includes at least one of an Electronic Article Surveillance (EAS) element and a Radio Frequency Identification (RFID) element disposed within the inner volume. The system also includes a reversible adhesive disposed on at least a portion of the outer surface.

Another aspect of the invention provides an apparatus in which a security tag has an exterior surface, an interior surface, an inner volume and at least one aperture. The tag includes at least one of an Electronic Article Surveillance (EAS) element and a Radio Frequency Identification (RFID) element disposed within the inner volume. The aperture defines a passage to the interior surface. A reversible adhesive is disposed on at least a portion of the interior surface of the tag. At least one cable being removably insertable within the at least one aperture. The cable is detachably couplable to the reversible adhesive.

Still another aspect of the invention provides an apparatus in which a security tag has an inner volume and at least one of an Electronic Article Surveillance (EAS) element and a Radio Frequency Identification (RFID) element disposed within the inner volume. An anchoring element having a first end removably affixes the security tag to an article. A reversible adhesive is disposed on at least a portion of the first end of the anchoring element.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components steps related to implementing a method and system for security tag deployment using reversible adhesives, and more specifically to a method and system for security tag attachment and removal using a reversible adhesive. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
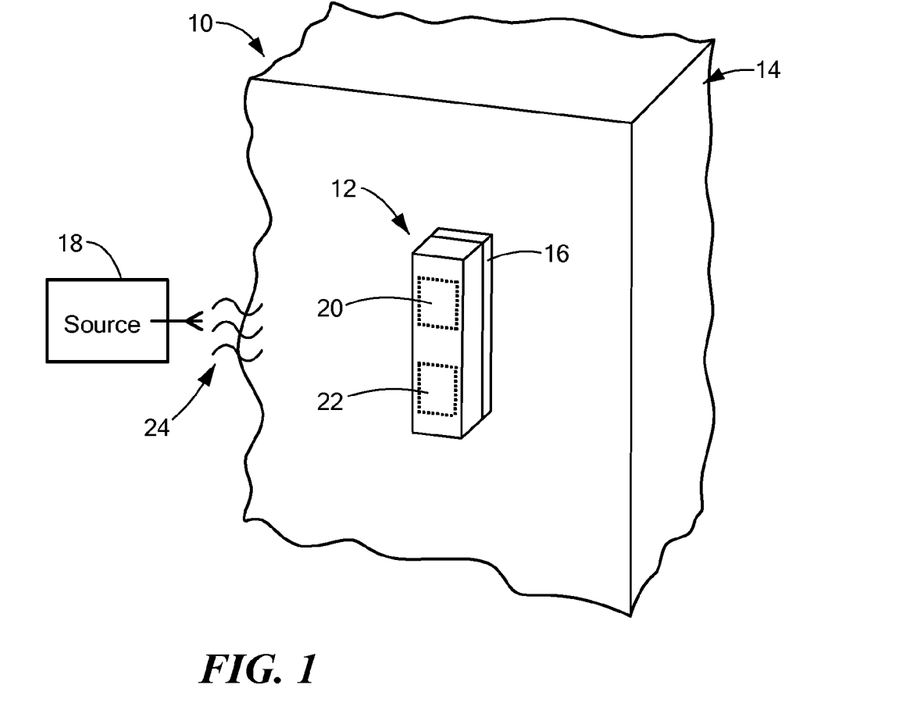
FIG. 1 is a perspective view of an exemplary embodiment of the security tag system constructed in accordance with the principles of the present invention.

One embodiment of the present invention advantageously provides a method and system for security tag attachment using a reversible adhesive. Referring now to the drawing figures, in which like reference designators refer to like elements, there is shown in FIG. 1 a system constructed in accordance with the principles of the present invention and designated generally as "10." System 10 may include a tag 12, article 14, reversible adhesive 16 and source 18. The interior of the tag 12 may include an EAS element 20 and/or an RFID element 22. The article 14 may be composed of any tangible medium to which the reversible adhesive 16 may bond. The tag 12 includes an exterior and interior surface. The reversible adhesive 16 can be disposed on the exterior or interior surface based on implementation considerations as discussed herein. The source 18 may include a signal generator that generates a signal 24 to thermally affect the reversible adhesive 16.

In particular, with reference to FIG. 1, the tag 12 may include an EAS element 20, RFID element 22 and/or other elements disposed within the tag 12. The tag 12 may be a hard tag, label, among others types known in the art. The tag 12 may be a hollow shell composed of plastic or other materials known in the art. The EAS element 20 may be composed of a magnetic element, acousto-magnetic element, microwave element, radio frequency element and the like. The EAS element 20 may function to receive and transmit signals. The RFID element 22 may include a radio frequency element that receives and transmits RF signals. The particular configurations and functions of the EAS element 20 and RFID element 22 are well known in the art and will not be further discussed.

As illustrated in FIG. 1, the article 14 may have at least one surface to which the adhesive may be adhered, i.e., bonded or coupled. The article 14 may be configured to any shape including geometric, non-geometric or a combination thereof. For example, the article 14 may be a box or container. The article 14 may include a porous surface having pores of sufficient size to allow the adhesive to enter the pores, thereby constructing a bond with the article 14 when the adhesive hardens or cures. Other surface types may also be used in accordance with the invention. Moreover, the article 14 may include tangible articles such as clothes, packaging, products and the like. Specifically, the article 14 may include fabric, plastic, cardboard, ceramics, metals, polymers and the like.

Still referring to FIG. 1, the adhesive used to detachably couple the tag 12 to the article 14 may be a reversible adhesive 16. The reversible adhesive 16 may include any adhesive that may temporarily or permanently release, i.e., debond, uncure, soften and the like, from a surface upon application of an energy source. For example, the signal 24 may be applied to the reversible adhesive 16 to thermally affect the adhesive, thereby causing the adhesive to release. The reversible adhesive 16 may be composed of an adhesive containing a magnetic additive such as paramagnetic particles, e.g., metal particles. When a high frequency electromagnetic (EM) field is applied to the reversible adhesive 16, the paramagnetic particles will oscillate and, in turn, heat the adhesive, i.e., thermally affect the adhesive. Alternatively, a different additive may be added to the reversible adhesive 16 so as to induce coupling of an electromagnetic field, thereby generating an electric current that will heat the reversible adhesive 16 causing the adhesive to release. Moreover, other types of reversible adhesives that release when an energy source is applied may be used in accordance with the principles of the invention. As such, the reversible adhesive 16 may detachably couple the tag 12 to the article 14 by thermally affecting the reversible adhesive 16. Also, depending on the specific reversible adhesive 16 used, the reversible adhesive 16 may be detachably coupled numerous times, e.g., the tag 12 may be reused.

Referring to FIG. 1, the source 18 is adapted to supply energy to the reversible adhesive 16 so as to thermally affect the adhesive. For example, the source 18 may include an EM field generator that produces an EM signal 24 at a frequency or various frequencies. The EM signal 24 may be applied to the reversible adhesive 16 causing the reversible adhesive 16 to release. Also, the intensity of the generated EM signal 24 may be varied in order to produce a greater or lesser thermal response from the reversible adhesive 16, e.g., induce a greater response from the paramagnetic particles, induce a greater current or the like. An EM signal 24 of greater intensity may also enable the EM field to travel a greater distance, thereby allowing the source 18 to be positioned a greater distance from the tag 12. It is also contemplated that the reversible adhesive 16 can be made sensitive to multiple frequencies such that the reversible adhesive needs two or more different signals, i.e., signals at different frequencies, in order to release. Such an arrangement provides increased security by making it more difficult for a wrongdoer to tamper with the adhesive. The specific type of EM field generator used may depend on various factors such as size, cost, power consumption, frequency generation, signal strength and the like.

Moreover, the source 18 may include other types of energy generators such as a voltage generator, current generator and the like, that may be applied directly to the reversible adhesive 16 and/or tag 12. For example, the voltage generator may apply a voltage to a pair of contact points on the tag 12 in order to generate a current across the reversible adhesive 16, thereby thermally affecting the reversible adhesive 16. The contact points may include signal traces or may be points directly on the reversible adhesive 16.

With reference to FIG. 1, the tag 12 may be configured to detachably couple with the article 14 using a non-mechanical mechanism, i.e., non-moving mechanical parts, by using the reversible adhesive 16. This configuration may allow for a smaller tag profile that may be more tamper resistant and easier to hide on the article 14 then conventional tags. Also, this configuration may reduce the cost and time of production, e.g., simplify manufacturing, use less materials and the like.

Also, using the reversible adhesive 16 may allow the tag 12 to be detached from the article 14 without causing damage to either the article 14 or the tag 12. Specifically, none or substantially none of the article is torn off upon removal of the tag 12 from the article 14. Also, the use of the EM signal 24 may not damage the article 14, nor may the thermal energy generated by the EM signal 24 damage the article 14, e.g., the generated heat does not damage the article. Accordingly, the tag 12 incorporating a reversible adhesive 16 may be detached from the article 14 without causing damage to the article 14.

Figure 2:
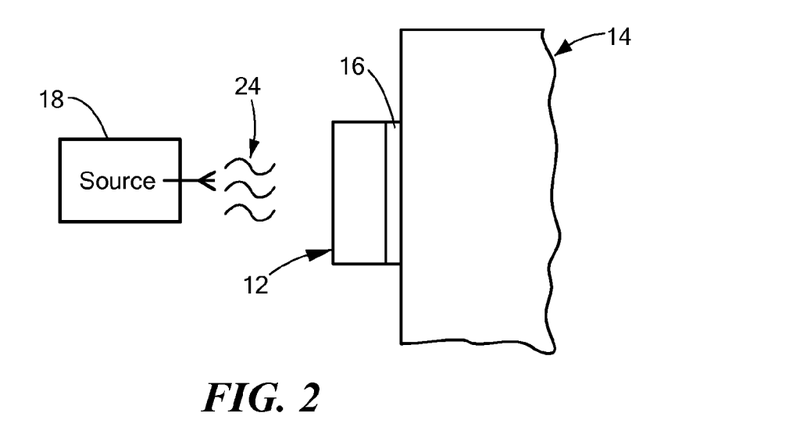
FIG. 2 is a side view of the embodiment of FIG. 1.

FIG. 2 illustrates a side view of the embodiment of FIG. 1 in which the reversible adhesive 16 may be used to detachably couple the tag 12 to the article 14, e.g., to a container. In particular, the reversible adhesive 16 may be coated to an exterior surface of the tag 12 that may be detachably coupled to a portion of the article 14, e.g., the reversible adhesive 16 may be coated to a portion or to an entire side of the tag 12. The amount of reversible adhesive 16 disposed on the tag, e.g., thickness and area, may be varied as these and other criteria may affect the time needed for the reversible adhesive 16 to bond or release, i.e., a smaller reversible adhesive 16 area may require less time to bond.

Figure 3:
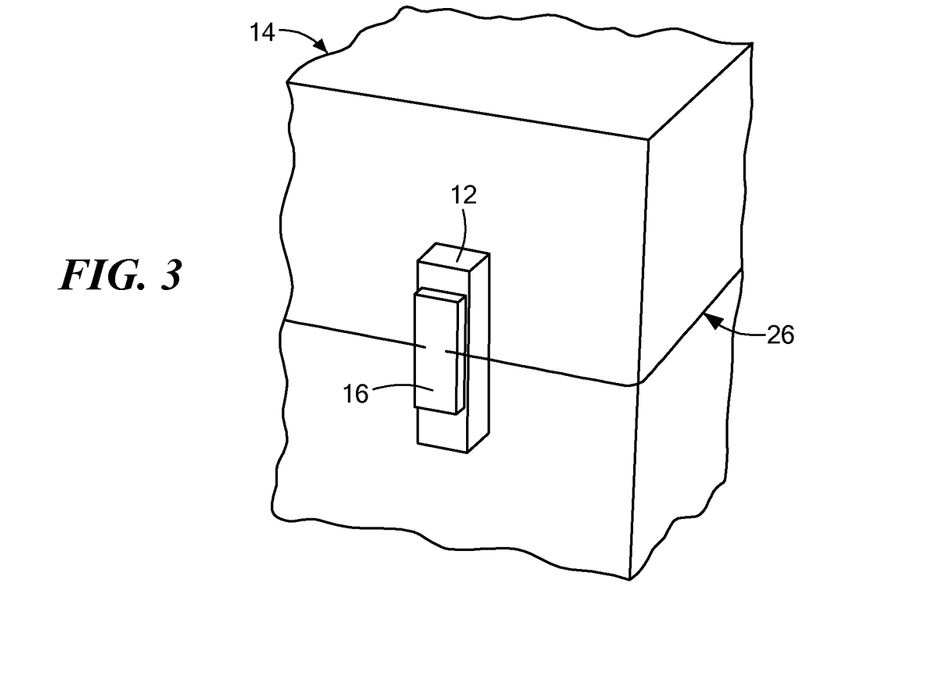
FIG. 3 is a perspective view of an alternative embodiment of the security tag system constructed in accordance with the principles of the present invention.

Referring to FIG. 3, there is illustrated an alternative embodiment of the tag 12 with reversible adhesive 16. In particular, the tag 12 includes the reversible adhesive 16 on an exterior surface not facing the article 14, e.g., on a surface opposite the side facing the article 14. In this configuration, the reversible adhesive 16 may be used to detachably couple one or more ends of a cable 26 to the tag 12. For example, as illustrated in FIG. 3, both ends of the cable 26 are detachably coupled to the reversible adhesive. In particular, the source 18 may be used to release the reversible adhesive 16 in order to detachably couple the cable ends to the tag 12, or to decouple the cable ends from the tag 12 in order to remove the tag 12. The cable 26 may include a strand or multiple strands of wire, rope and the like, made of metal, nylon, and the like. Moreover, the cable may be composed of a material to which the reversible adhesive 16 may bond. The cable ends that are detachably coupled to the reversible adhesive 16 may also be varied. For example, the cable ends may have a greater width than the cable 26 so as to detachably couple a greater portion of the cable end to the reversible adhesive 16, e.g., flat cable ends.

Figure 4:
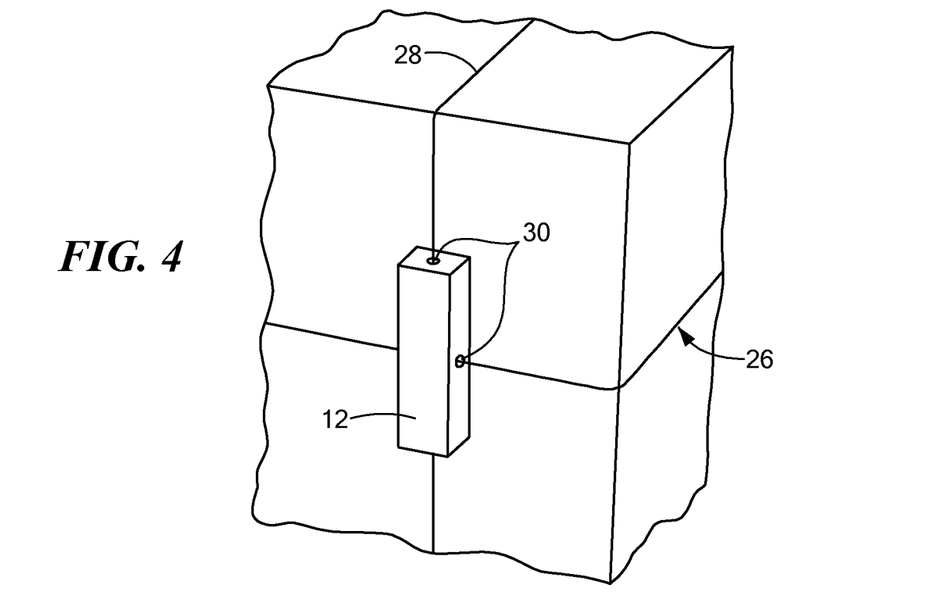
FIG. 4 is a perspective view of still another alternative embodiment of the security tag system constructed in accordance with the principles of the present invention.

Also, additional cables, e.g., cable 28 in FIG. 4, may be detachably coupled to the reversible adhesive 16. For example, one or more cables may be added to the configuration of FIG. 3 in which the one or more cables may wrap around the entire or a portion of article 14. The ends of the one or more cables may be detachably coupled to the tag 12. The addition of one or more cables may serve to further secure the tag 12 to the article 14, i.e., may make the tag 12 harder to remove without the use of the source 18.

Alternatively, one end of the cable 26, 28 may be permanently coupled to the tag 12 via a mechanical mechanism, permanent adhesive or other mechanisms known in the art. In other words, one end of the cable 26 may be affixed to the tag 12 while the other end may be detachably coupled to the reversible adhesive 16. This configuration may make tag attachment easier, i.e., may be easier for one person to attach the tag 12.

Also, the tag 12 illustrated in FIG. 3 may have an additional reversible adhesive coating on the outer surface facing the article 14 (not shown). In particular, using a tag 12 having two sides coated with the reversible adhesive 16 and at least one cable 26 may significantly increase the tamper resistance of the tag 12, i.e., a thief will have a harder time removing the tag 12 without damaging the article 14. Moreover, the tag 12 may be easier to attach to the article 14. For instance, the tag 12 may first be detachably coupled to the article 14 and then the cable 26 may be detachably coupled to the tag 12 without having to hold the tag 12 in place, i.e., the tag 12 is already detachably coupled to the article 14 using a reversible adhesive. Also, the additional reversible adhesive coating may be added to the tag 12 illustrated in FIG. 4, discussed below.

Referring to FIG. 4, an alternative embodiment of the tag 12 is illustrated. Specifically, the reversible adhesive 16 may be disposed on an interior area or surface within the tag 12 so as to detachably couple at least one cable end to the tag 12, e.g., cables 26 and/or 28. In particular, the tag 12 may have one or more apertures 30 disposed on one or more sides of the tag 12. Each aperture 30 leads to the interior area coated with the reversible adhesive 16, i.e., the cable end may be removably insertable into the aperture 30. The source 18 may be applied to the tag 12 to release the reversible adhesive 16, thereby allowing the cable ends to detachably couple to the adhesive 16. The at least one or more apertures 30 may include an opening, hole and the like. The size of the aperture 30 may be varied depending to several factors including size of the cable, size of the tag, manufacturing constraints and the like. Also, the tag 12 may have at least one cable end permanently attached via a mechanical mechanism, permanent adhesive or other mechanisms known in the art so as to allow only one end of the cable to be detachably coupled to the tag 12.

Figure 5:
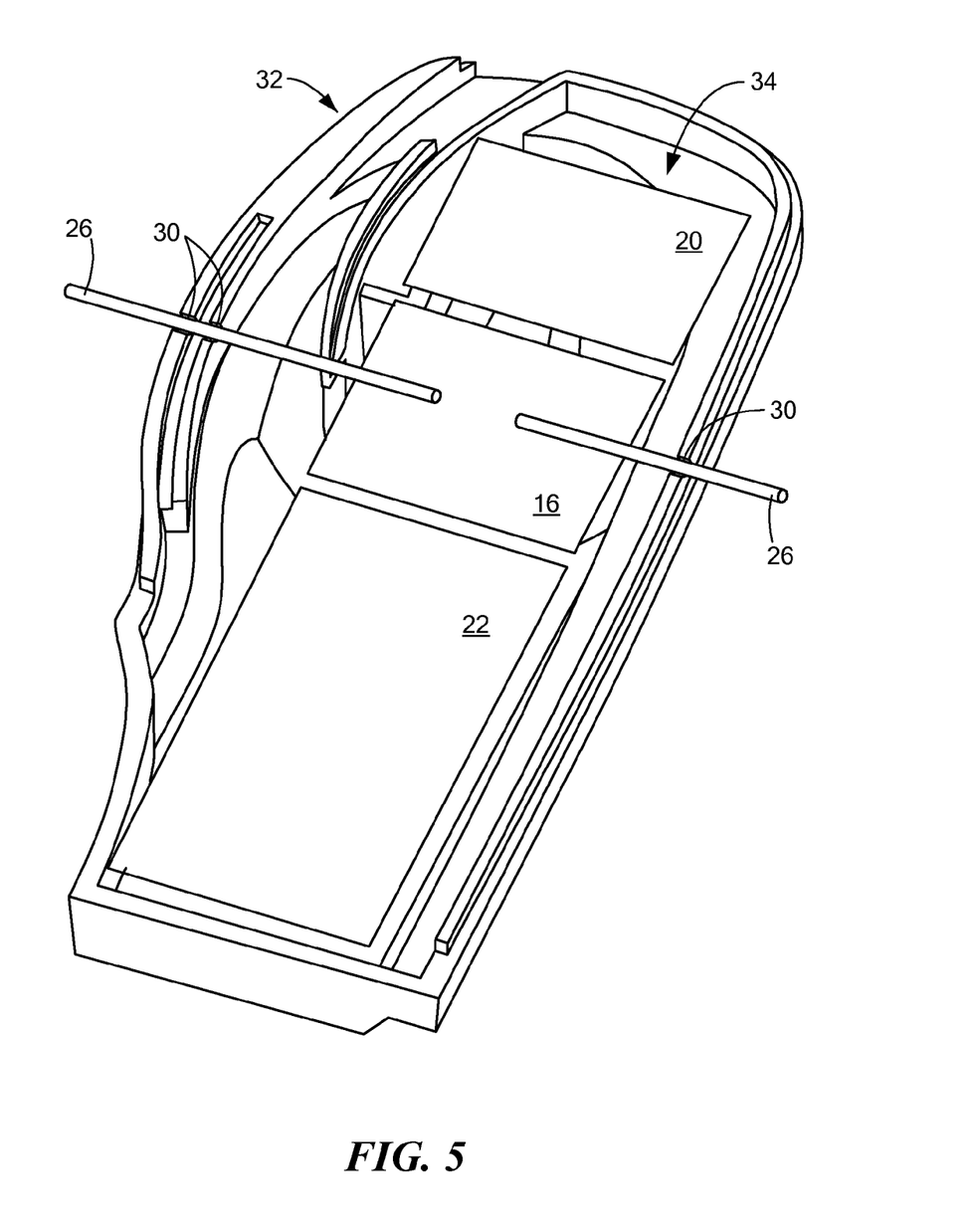
FIG. 5 is a view of an open hard tag with reversible adhesive in the interior in accordance with the principles of the present invention.

FIG. 5 shows a hard tag 32 with the cover removed, exposing the interior portion 34 of the hard tag 32. The hard tag 32 includes an EAS element 20 and/or RFID element 22, reversible adhesive 16 area, and apertures 30 on opposite sides of the hard tag 32. In particular, the reversible adhesive 16 may be coated on at least part of an interior portion 34 of the hard tag 32 in which each aperture 30 provides access to the reversible adhesive 16. Each end of the cable 26 may be inserted into a different aperture 30 in order to be detachably coupled to the reversible adhesive 16. Alternatively, the hard tag 32 may have only one aperture 30 through which both ends of the cable 26 may be inserted in order to detachably couple the cable ends to the reversible adhesive 16. Moreover, additional apertures 30 and/or cable ends and/or reversible adhesive areas may be added at various parts of the hard tag 32.

Figure 6:
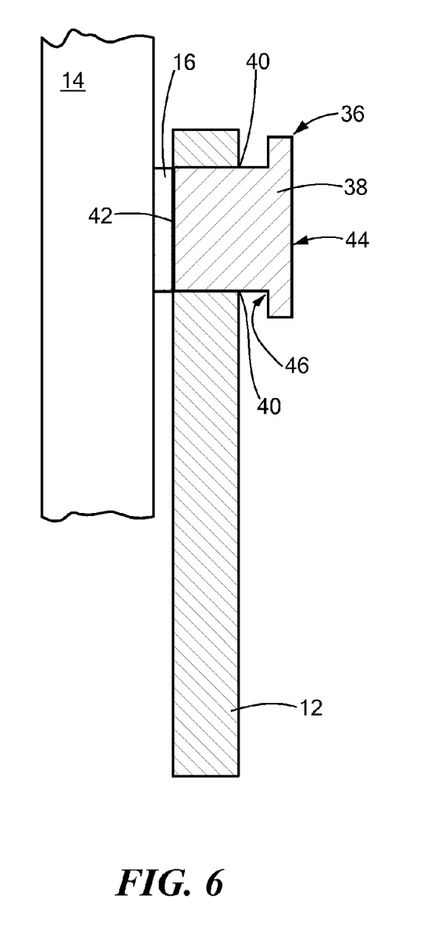
FIG. 6 is a side view of an embodiment of the security tag system using an adhesive coated button in accordance with the principles of the present invention.

Referring to FIG. 6, a tag 12 with a releasable fastener 36 is illustrated. The releasable fastener 36 may include an anchor 38 with a reversible adhesive 16, thereby allowing the releasable fastener 36 to be detachably coupled to the article 14. The tag 12 may have an aperture 40 having a diameter ($D_{tag}$) through which a portion of the releasable fastener 36 may be positioned. In particular, the releasable fastener 36 may have at least two ends opposite each other, in which the diameter (D1) of the first end 42 may be smaller than the tag aperture 40 and the diameter (D2) of the second end 44 may be larger than the tag aperture 40. Reversible adhesive 16 is applied to the first end 42. Once the first end 42 of the releasable fastener is inserted into the aperture 40, the second end 44 of the anchor 38 may help secure the tag 12. In particular, the second end 44 may define a lip 46 that prevents the tag 12 from being removed. Moreover, the configuration illustrated in FIG. 6, may allow for different types of tags to be removably secured to an article 14. For example, a store owner may want certain articles to include only an EAS element 20 and other articles to include both an EAS element 20 and RFID element 22. In this case, the store owner may configure the appropriate tag to the article 14 by inserting the anchor 38 into a specific type of tag and detachably coupling anchor 38 to the article 14.

Furthermore, separating the tag 12 and reversible adhesive 16 into removable parts of the security tag may reduce the cost of upgrading or replacing the security tag. For example, once the reversible adhesive 16 becomes worn down and fails to adequately adhere to the article 14, only a replacement anchor 38 with reversible adhesive 16 needs to be ordered as opposed to ordering a complete security tag with reversible adhesive 16 and EAS/RFID element(s). Also, as other technologies emerge in the field of electronic article surveillance, there may be a need to update the tag 12 to a newer technology. Using the configuration of FIG. 6, only the tag 12 needs to be replaced. As such, the cost of replacing or upgrading parts of the security tag may be partitioned so that the user is purchasing only the needed part(s).

Figure 7:
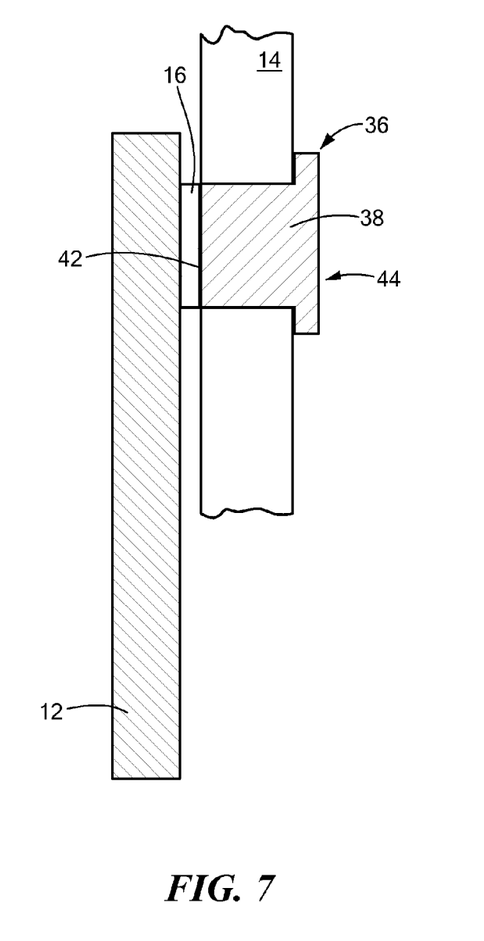
FIG. 7 is a side view of an alternative embodiment of the security tag system using an adhesive coated button in accordance with the principles of the present invention.

FIG. 7 illustrates an alternative embodiment of the tag 12 with a releasable fastener 36. In particular, the releasable fastener 36 may be removably coupled to the tag 12 through the article 14. The releasable fastener 36 may have a first end 42 and a second end 44 opposite the first end 42, each end having a respective diameter. The article 14 may include aperture 40, e.g., a button hole, having a diameter ($D_{article}$). In particular, the releasable fastener 36 may have the reversible adhesive 16 disposed on at least a portion of the first end 42. The first end 42 may be removably insertable into the aperture of the article. In particular, the diameter of the first end may be less than the diameter of the aperture ($D_{article}$). The second end of the releasable fastener 36 may have a diameter (D2) greater than the diameter of the aperture ($D_{article}$). As such, detachably coupling the releasable fastener 36 to the tag 12 through the article 14 secures the article 14 between releasable fastener 36 and tag 12.

Moreover, article 14 is not in contact with the reversible adhesive 16, thereby helping prevent damage to the article 14, e.g., helps prevent ripping the article when taking off the releasable fastener 36 with or without the using the source 18. Also, this configuration may allow the tag 12 with releasable fastener 36 to be used with any article 14 having a sufficiently sized aperture; even if article 14 has a surface that the reversible adhesive 16 cannot adhere to, i.e., the fastener cannot bond sufficiently to the article 14. As such, the embodiment of FIG. 7 may allow the security tag 12 to be use in combination with a wide variety of articles.

Figure 8:
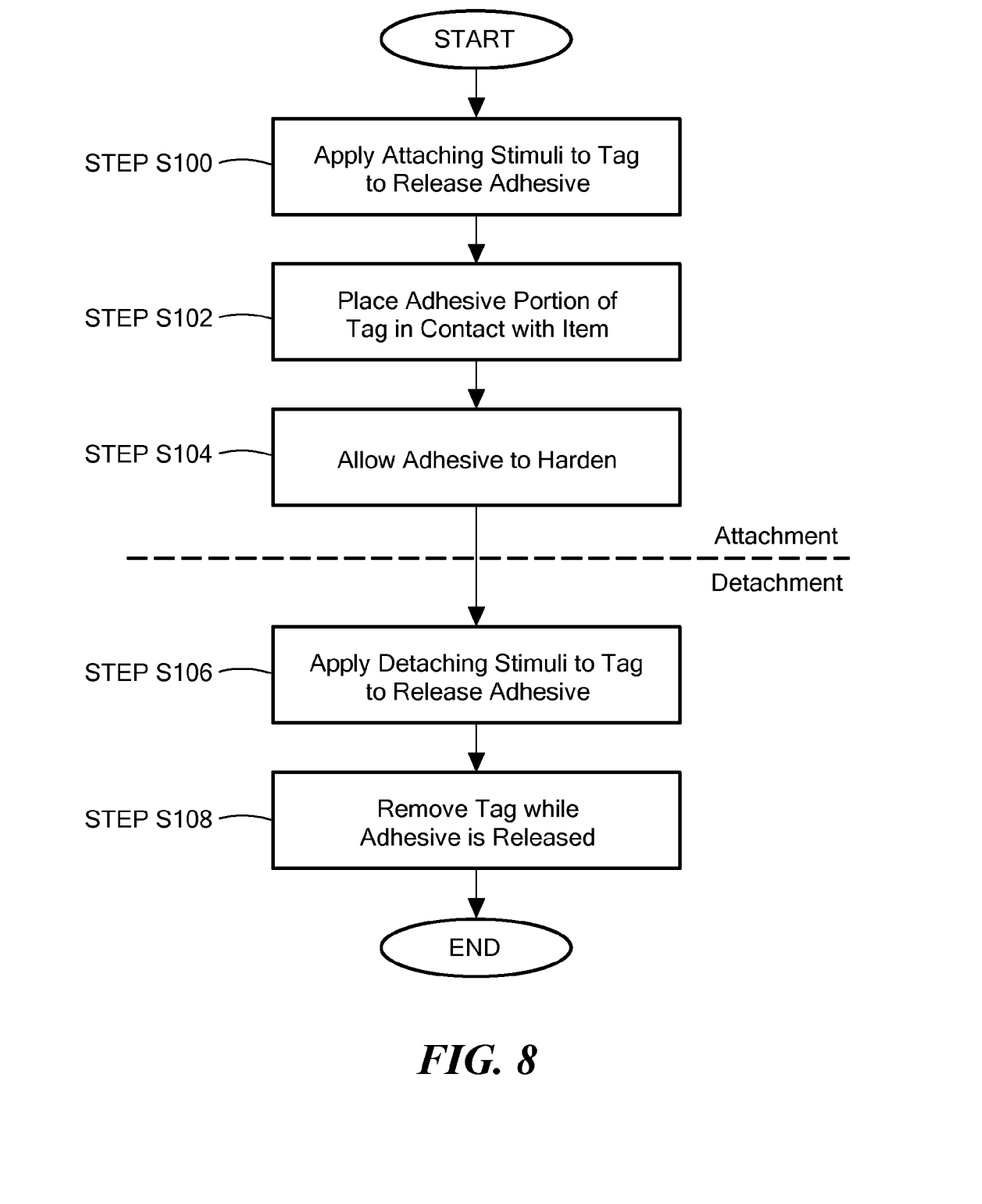
FIG. 8 is a flow chart of an exemplary security tag application and removal process in accordance with the principles of the present invention.

FIG. 8 illustrates an exemplary process by which a tag 12 having a reversible adhesive 16 may be attached to and subsequently detached from article 14. An attaching stimuli is applied to the tag 12 to release the reversible adhesive 16, e.g., thermally affect the reversible adhesive 16 (Step S100). The attaching stimuli or signal may originate from the signal generator discussed above, e.g., EM signal generator. Once the reversible adhesive 16 is sufficiently released, the attaching stimuli may be removed and the reversible adhesive 16 portion of the tag 12 may be placed into contact with the article 14 and/or the cable(s) 26, 28 may be placed into contact with the reversible adhesive 16 (Step S102). The reversible adhesive 16 will bond with the article 14 and/or cables(s) 26, 28 to detachably couple the tag 12 and the article 14 and/or cable(s) together. The amount of time needed to bond may vary depending on the reversible adhesive 16 used, the area of the reversible adhesive 16 coating, on the amount of attaching stimuli applied and the like (Step S104). For example, the more the reversible adhesive 16 is thermally affected, the longer it may take to bond. As such, the tag 12 with reversible adhesive 16 may be attached by using the attaching stimuli to thermally affect the reversible adhesive 16.

The tag 12 may be removed by applying a detaching stimuli to the tag 12 in order to release the reversible adhesive 16 (Step S106) and remove the tag 12 (Step S108). The detaching stimuli may be substantially the same signal 24 and duration as the attaching stimuli, i.e., both stimuli may release the reversible adhesive 16 to a similar degree, thereby simplifying the system 10. Alternatively, both stimuli may also be different in both signal 24 and duration. For example, the signal 24 and duration of the attachment stimuli may be configured so that the reversible adhesive 16 is released only enough to allow adhesion to the article 14. In other words, portions of the reversible adhesive 16 may remain relatively bonded while other portions may be released such as the portion being detachably coupled to the article 14 and/or cable 26. This may decrease the amount of time needed for the adhesive to bond. On the other hand, the detaching stimuli may be different than the attaching stimuli in order to greater thermally affect the reversible adhesive. In particular, more thermal energy may be needed to ensure all the reversible adhesive 16 releases in order to help prevent damage to the article/item. For example, the entire region of the reversible adhesive 16 may be released in order to help prevent a portion of the article 14 from remaining on the tag 12 after removal from the article 14. This will prevent tearing a portion of the article 14.

Unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system, comprising:
    a security tag having:
        an outer surface;
        an inner volume; and
        at least one of an Electronic Article Surveillance (EAS) element and a Radio Frequency Identification (RFID) element disposed within the inner volume; and
    a reversible adhesive disposed on at least a portion of the outer surface, the reversible adhesive arranged to release if thermally affected by an electromagnetic field.

2. The system of claim 1, further comprising a source generating the electromagnetic field to thermally affect the reversible adhesive, the reversible adhesive remaining substantially bonded if not thermally affected by the electromagnetic field.

3. The system of claim 2, wherein the field is an electromagnetic field.

4. The system of claim 1, further comprising at least one cable having a first end detachably couplable to the reversible adhesive.

5. The system of claim 4, wherein the at least one cable has a second end opposite the first end, the second end being detachably couplable to the reversible adhesive.

6. The system of claim 4, wherein the second end is fixed to the tag.

7. The system of claim 1, wherein the reversible adhesive is releasable only in the presence of at least two different fields.

8. An apparatus, comprising:
a security tag having:
an exterior surface;
an interior surface;
an inner volume;
at least one aperture defining a passage to the interior surface;
at least one of an Electronic Article Surveillance (EAS) element and a Radio Frequency Identification (RFID) element disposed within the inner volume;
a reversible adhesive disposed on at least a portion of the interior surface of the tag; and
at least one cable, the at least one cable being removably insertable within the at least one aperture and detachably couplable to the reversible adhesive.

9. The apparatus of claim 8, wherein the at least one cable includes a first end and a second end opposite the first end, the first end being detachably couplable to the reversible adhesive and the second end being fixed to the tag.

10. The apparatus of claim 8, wherein the at least one cable includes a first end and a second end opposite the first end, both ends being detachably couplable to the reversible adhesive.

11. The apparatus of claim 8, wherein the at least one cable includes a plurality of cables and the at least one aperture includes a plurality of apertures, each of the plurality of cables being removably insertable within a respective aperture and being detachably couplable to the reversible adhesive.

12. The apparatus of claim 8, wherein the reversible adhesive includes metal.

13. An apparatus, comprising:
a security tag having:
an inner volume; and
at least one of an Electronic Article Surveillance (EAS) element and a Radio Frequency Identification (RFID) element disposed within the inner volume;
an anchoring element having a first end, the anchoring element removably affixing the security tag to an article; and
a reversible adhesive disposed on at least a portion of the first end of the anchoring element.

14. The apparatus of claim 13, wherein the tag includes an aperture having a diameter, the first end of the anchoring element having a first diameter less than the diameter of the aperture and being removably insertable within the aperture.

15. The apparatus of claim 14, wherein the anchoring element has a second end opposite the first end, the second end having a second diameter, the second diameter being greater than the diameter of the aperture.

16. The apparatus of claim 15, wherein the second end defines at least one lip.

17. The apparatus of claim 13, wherein the reversible adhesive removably affixes the anchoring element to the tag.

18. The apparatus of claim 17, wherein the anchoring element includes a second end opposite the first end, the first end and second end each having a corresponding diameter, the diameter of the second end being greater than the diameter of the first end.

19. The apparatus of claim 18, wherein the second end defines at least one lip.

20. The apparatus of claim 13, wherein the reversible adhesive includes metal.

\* \* \* \* \*